United States Patent [19]

Doyle et al.

[11] Patent Number: 5,001,563
[45] Date of Patent: Mar. 19, 1991

[54] METHOD OF AND CIRCUIT FOR PROCESSING A PICTURE SIGNAL

[75] Inventors: Terence Doyle; Martine Looymans, both of Eindhoven, Netherlands

[73] Assignee: U.S. Philips Corporation, New York, N.Y.

[21] Appl. No.: 398,101

[22] Filed: Aug. 23, 1989

[30] Foreign Application Priority Data

Sep. 27, 1988 [NL] Netherlands ............... 8802365

[51] Int. Cl.⁵ .................. H04N 7/01; H04N 11/20
[52] U.S. Cl. ................................. 358/140; 358/11
[58] Field of Search ............. 358/11, 12, 136, 140, 358/141, 160

[56] References Cited

U.S. PATENT DOCUMENTS 4,636,857 1/1987 Ashiha et al. ................. 358/11
4,785,351 11/1988 Ishikawa .................... 358/140

FOREIGN PATENT DOCUMENTS 0101583 6/1983 Japan ........................ 358/31

OTHER PUBLICATIONS

"A Practical IDTV System Improving Picture Quality for Nonstandard TV Signals" by Kurita et al; IEEE Transactions on Consumer Electronics, vol. 34, No. 3, Aug. 1988, pp. 387–395.

"Integrated Digital IDTV Receiver with Features" by Nainipally et al; IEEE Transactions on Consumer Electronics, vol. 34, No. 3, Aug. 1988, pp. 410–419.

"Integrated Digital IDTV Receiver with Features" by Naimpally et al; IEEE 1988 International Conference on Consumer Electronics, Jun. 8–10, 1988, pp. 76–77.

Primary Examiner—John W. Shepperd
Assistant Examiner—Michael D. Parker
Attorney, Agent, or Firm—Edward W. Goodman

[57] ABSTRACT

In a picture signal processing circuit including an interpolation filter having a median filter (67) having a first input (63), a second input (69) and a third input (63) to which respective signals from picture elements of three positionally consecutive lines from a preceding and a present field of a line and field-sequentially assembled picture signal are applied, it has been found that a better result can be obtained for moving contours in the picture signal by taking a (weighted) average from these signals of the present field, and to take this average instead of or mixed with an output signal (Y') of the median filter (67).

17 Claims, 2 Drawing Sheets

METHOD OF AND CIRCUIT FOR PROCESSING A PICTURE SIGNAL

BACKGROUND OF THE INVENTION

1. Field of the Invention

The invention relates to a method of processing a line- and field-sequentially assembled picture signal, including a determination of the median of signals from three positionally consecutive lines from two consecutive fields of the picture signal and supplying an output signal.

The invention also relates to a picture signal processing circuit comprising means for determining the median of signals from three positionally consecutive lines from two consecutive fields of a line- and field-sequentially assembled picture signal and supplying an output signal.

The invention further relates to a picture signal processing circuit comprising an interpolation filter including a median filter having a first, a second and a third input for receiving respective signals from three positionally consecutive lines from two consecutive fields of a line- and field-sequentially assembled picture signal, said median filter having an output for supplying an output signal which is the median of the applied signals.

2. Description of Related Art

Such a method and such picture signal processing circuit are disclosed in the European patent application No. EP-A 0,192,292, and are suitable for use in numerous applications described therein. In the event of moving contours in the picture signal, it has been found that when the prior art method or the prior art median filter, respectively, are used, disturbing effects, more specifically, serration of sloping contours, occur in the output signal.

SUMMARY OF THE INVENTION

It is inter alia an object of the invention to provide a method of and circuits for processing a picture signal in which said disturbing effects are obviated, at least reduced.

According to the invention, a method of processing a picture signal of the type defined in the opening paragraph is characterized in that the method further includes supplying a linear combination of the signals from the two lines other than the central line of the three positionally consecutive lines, the median or a mixed result of these two being the output signal.

A picture signal processing circuit of the first type defined in the opening paragraph is therefore characterized, in accordance with the invention, in that means are further arranged for supplying a linear combination of the signals from the two lines other than the central line of the three positionally consecutive lines, the median, or a mixed result of these two, as the output signal.

A picture signal processing circuit of the second type defined in the opening paragraph is characterized in accordance with the invention, in that the interpolation filter further includes an averaging circuit and a mixer, the averaging circuit having a first and a second input coupled to the first and third input, respectively, of the median filter, and the mixer having a first input coupled to the output of the median filter, a second input coupled to an output of the averaging circuit, and an output coupled to an output of the interpolation filter.

Due to the combination of a linearly interpolated signal and the median, the disturbing effects are reduced to a high degree.

A first implementation of the processing method according to the invention is characterized in that the method further includes determining a comparison result of the difference between the median and the signal from the central line of the three positionally consecutive lines with a threshold value, an evaluation of a function having the comparison result as an argument, said mixed result being determined in dependence of the evaluation of the function.

A first implementation of the first picture signal processing circuit according to the invention is characterized in that means are further arranged for determining a comparison result obtained by comparing the difference between the median and the signal from the central line of the three positionally consecutive lines with a threshold value, an evaluation of a function having the comparison result as an argument, said mixed result being determined in dependence of the evaluation of the function.

A first implementation of the second picture signal processing circuit according to the invention is characterized in that the interpolation filter further includes a comparison circuit having a first input coupled to the output of the median filter and a second input coupled to the second input of the median filter, the mixer having a control input coupled to an output of the comparison circuit.

These first implementations of the invention are based on the recognition that when the signal of the picture element from the preceding field is not located between the signals from the two picture elements of the present field, the median of the three signals will be one of the two signals from the present field, more specifically that signal that is nearest to the signal from the preceding field, without there being any further reason to opt for that signal. In this case it has been found that a better result can be obtained by taking a (weighted) average of these signals from the present field, and to take this average instead of or mixed with the median.

A second implementation of the processing method according to the invention is characterized in that the method further includes determining a direction of a contour in the picture signal, the median being supplied as the output signal if the determined direction is substantially vertical.

A second implementation of the first picture signal processing circuit according to the invention is characterized by comprising means for determining a direction of a contour in the picture signal, the median being supplied as the output signal if the determined direction is substantially vertical.

A second implementation of the second picture signal processing circuit according to the invention is characterized by comprising a contour direction determining circuit having an output coupled to a further control input of the mixer.

Due to the measure of these second implementations of the invention, also serrations caused by angles in the neighborhood of, but not equal to, 45 degrees are reduced.

BRIEF DESCRIPTION OF THE DRAWINGS

These and other aspects of the invention will now be described and elucidated in greater detail by way of non-limitative examples with reference to the accompanying drawing, in which.

DESCRIPTION OF THE PREFERRED EMBODIMENT

Figure 1:
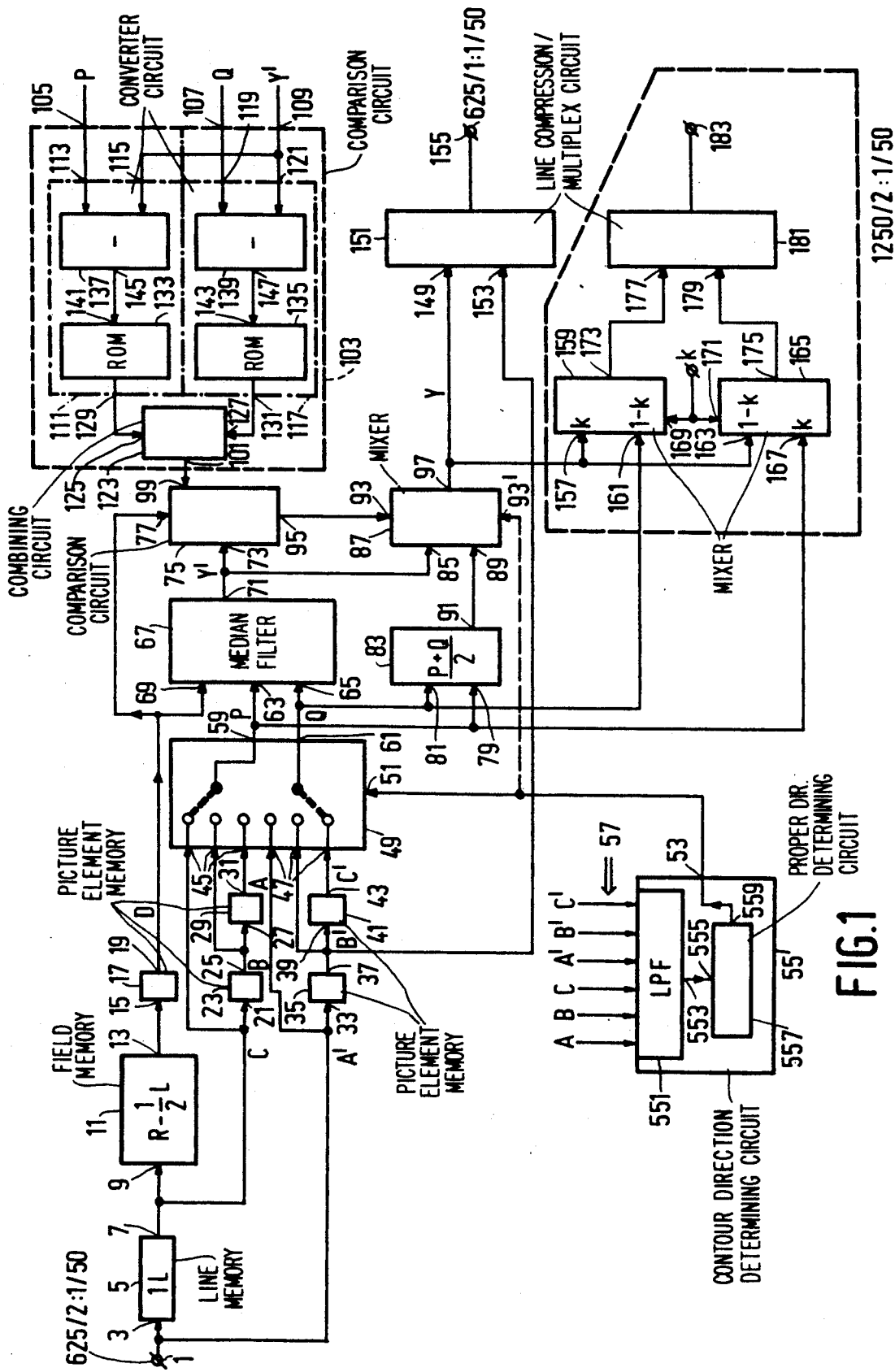
FIG. 1 shows a picture signal processing circuit according to the invention.
Figure 2:
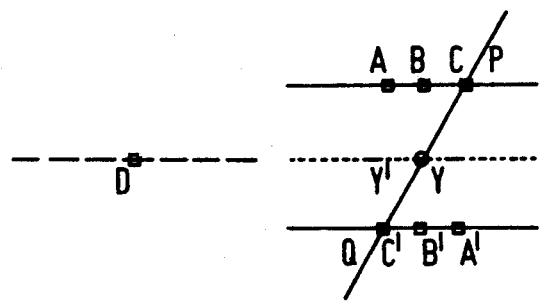
FIG. 2 shows a configuration of picture elements.

In FIG. 1, a line and field-sequentially assembled input picture signal for television is applied to an input 1 of a picture signal processing circuit having an interpolation filter. For each picture this input picture signal has, for example, 625 lines, which are distributed in an interlaced manner over two fields, 50 fields being transmitted per second. In the Figure this is denoted by 625/2:1/50. The picture signal processing circuit according to the invention can alternatively be used for picture signals of a different structure, for example a 525/2:1/59.94 picture signal or a 1125/2:1/60 picture signal. The input 1, which also constitutes an input of the interpolation filter, is connected to an input 3 of a line memory 5. An output 7 of the line memory 5 is connected to an input 9 of a field memory 11, which may contain a field minus half a line of the picture signal. An output 13 of the field memory 11 is connected to an input 15 of a picture element memory 17, at an output 19 of which a signal of a picture element D is available. The output 7 of the line memory 5 is further connected to an input 21 of a picture element memory 23, an output 25 of which is connected to an input 27 of a picture element memory 29. Signals from picture elements C, B and A, respectively, are available at the input 21 of the picture element memory 23, at the output 25 thereof and at an output 31 of the picture element memory 29. The input 1 of the picture signal processing circuit is further connected to an input 33 of a picture element memory 35, an output 37 of which is connected to an input 39 of a picture element memory 41. Signals from picture elements A', B' and C', respectively, are available at the input 33 of the picture element memory 35, at the output 37 thereof and at an output 43 of the picture element memory 41. The relative position of the picture elements A, B, C, A', B', C' and D is as is shown in FIG. 2, the picture element D being indicated at the left on a broken-line line of a first field of the input signal and to the right the picture elements A, B, C, A', B', and C' on solid-line lines of a second field of the input signal. Between these solid lines the position of a line of the output signal of the interpolation filter is denoted by means of a dotted line. Y and Y' denote signals of a picture element to be interpolated on this line. Reverting to FIG. 1, the signals from the picture elements C, B and A are applied to a first input combination 45 and the signals of the picture elements A', B' and C' are applied to a second input combination 47 of a selection circuit 49, a control input 51 of which is connected to an output 53 of a contour direction determining circuit 55. The signals from the picture elements A, B, C and A', B', C' are applied to an input combination 57 of the contour direction determining circuit 55 to determine which pair of picture elements (A, A'), (B, B') or (C, C') evidences the best mutual resemblance. This pair becomes available at outputs 59 and 61 of the selection circuit 49, and will be designated the pair (P, Q) in the sequel. In FIG. 2 a sloping line indicates a contour on which the picture elements C and C' were found to be located. In this case the pair (P, Q) is consequently chosen equal to the pair (C, C'), since the respective picture elements A, A' and B, B' are located on both sides of the contour. For further details about possible embodiments of the contour direction determining circuit 55 and the selection circuit 49 of FIG. 1, reference is made to FIG. 21 of the said European patent application EP-A 0,192,292.

The outputs 59 and 61 of the selection circuit 49 are connected to a first input 63 and a third input 65, respectively, of a median filter 67, a second input 69 of which is connected to the output 19 of the picture element memory 17, so that signals from three positionally consecutive lines of two consecutive fields of the input picture signal are applied to the first input 63, the second input 69 and the third input 65 of the median filter 67. From an output 71 of the median filter 67, the output signal Y' of the picture element to be interpolated is supplied, which has consequently been obtained in dependence on the contour from the signals of the picture elements P, Q and D, as is shown in FIG. 2. This output signal Y' of the median filter 67 will also be denoted the median Y' hereinafter. So far, the circuit of the invention, shown in FIG. 1, corresponds to the prior art circuit.

The output 71 of the median filter 67 is connected, in accordance with a first implementation the invention, to a first input 73 of a comparison circuit 75, a second input 77 of which is connected to the second input 69 of the median filter 67. A first input 79 and a second input 81 of an averaging circuit 83 are connected to the first input 63 and to the third input 65, respectively, of the median filter 67. A first input 85 of an a mixer 87 is connected to the output 71 of the median filter 67, a second input 89 of the mixer 87 is connected to an output 91 of the averaging circuit 83, and a control input 93 of the mixer 87 is connected to an output 95 of the comparison circuit 75. The output signal Y is supplied from an output 97 of the mixer 87. At its output 91, the averaging circuit 83 supplies the average value of the signals of the picture elements P and Q at its inputs 79 and 81, respectively. The comparison circuit 75 compares the output signal Y' at the output 71 of the median filter 67 to the input signal D at the second input 79 of the median filter 67, and, in dependence on the comparison result, so controls the mixer 87 that when the median Y' differs (for more than a predetermined threshold value) from the input signal of the picture element D, the mixer 87 will opt for supplying the average value of the signals from the picture elements P and Q instead of the median Y' as the output signal Y. When the comparison circuit 75 is designed as read-only memory, preferably preceded by a subtracter circuit so that a read-only memory of half the capacity can be used, it is also possible to obtain a smooth transition between these two extremes. The mixer 87 will then not be designed as a simple change-over switch, but as a mixer circuit which supplies a weighted average of its input signals at its input 85 and 89 which depends on a control signal at its control input, as the output signal Y.

The interpolation filter, described in the foregoing, of the picture signal processing circuit according to the first implementation of the invention consequently comprises the median filter 67, the comparison circuit 75, the mixer 87 and optionally also the selection circuit 49 with the direction determing circuit 55. By choosing or mixing in accordance with the invention of the median Y', on the one hand, and the average value of the signals from the picture elements P and Q, on the other hand, disturbing phenomena in the output signal of the prior art interpolation filter are obviated or at least reduced. These disturbing phenomena, more specifically a serration of moving sloping contours in the picture signal, could occur as a result of the fact that the median filter 67 will choose, when the signal from the picture element D from the preceding field is not located between the signals from the two picture elements P and Q of the present field, for one of the two signals from the two signals from the present field, more specifically for that signal that is located nearest to the signal from the preceding field, without there being any further reason to opt for that signal.

The efficiency of the interpolation filter of the picture signal processing circuit according to the invention can be improved when the output signal Y' of the median filter 67 differs only slightly from the input signals of the picture elements P or Q at the first input 63 and the third input 65, respectively, of the median filter 67, by having the average value of the signals of the picture elements P and Q applied as the output signal from the output 97 of the mixer 87 when the mixer 87 is designed as a change-over switch, and if the mixer 87 is designed as a mixer circuit, to give the average value of the signals of the picture elements P and Q a higher weight during the mixing operation. To that end, a third input 99 of the comparison circuit 75 is connected to an output 101 of a further comparison circuit 103, a first input 105 of which is connected to the first input 63 of the median filter 67, a second input 107 of the further comparision circuit 103 being connected to the third input 65 of the median filter 67 and a third input 109 of the further comparison circuit 103 being connected to the output 71 of the median filter 67. This further comparison circuit 103 comprises a first converter circuit 111, a second converter circuit 117 and a combining circuit 123. A first input 113 and a second input 115 of the first converter circuit 111 are connected to the first input 105 and to the third input 109, respectively, of the further comparison circuit 103. A first input 119 and a second input 121 of the second converter circuit 117 are connected to the second input 107 and to the third input 109, respectively, of the further comparison circuit 103. A first input 125 and a second input 127 of the combining circuit 123 are connected to respective outputs 129 and 131 of the first converter circuit 111 and the second converter circuit 117, respectively, an output of the combining circuit 123 being constituted by the output 101 of the further comparison circuit 103. The converter circuits 111 and 117 each comprise a read-only memory 133 and 135, respectively, and a subtracter circuit 137 and 139, respectively, outputs of the read-only memories 133 and 137 being constituted by the outputs 129 and 131, respectively, of the respective converter circuits 111 and 117. Inputs 141 and 143 of the read-only memories 133 and 135, respectively, are connected to outputs 145 and 147, respectively, of the respective subtracter circuits 137 and 139, inputs of which are constituted by the inputs of the respective converter circuits 111 and 117. It is alternatively possible to have each converter circuit 111 and 117 be constituted by only a read-only memory, but then this read-only memory must have twice the capacity compared with the case in which the read-only memory as shown in the drawing is preceded by a subtracter circuit. The combining circuit 123 may, for example, be a logic circuit, for example an AND or an OR-circuit, the choice between an AND or an OR-circuit depending on the mode of operation of the converter circuits 111 and 117 and of the comparison circuit 75.

The operation of the interpolation filter of the picture processing circuit according to the invention may alternatively be considered as performing the steps:

determining the median of signals from three positionally consecutive lines from two consecutive fields of the picture signal, and supplying as an output value, a linear combination of the signals from the two lines other than the central line, the median, or a mixing result of these two.

According to the first implementation of the invention, the following steps may be added:

determining a comparison result of the difference between the median and the signal from the central line of the three positionally consecutive lines with a threshold value and evaluating a function having the comparison result as an argument, said mixing result being determined in dependence of the evaluation of the function.

These steps can be represented with the aid of a number of commands from the programming language Fortran in the following way, in which "MEDIAN" is the name of a sub-routine which calculates the median from the supplied arguments P, D and Q, and in which T1 and T2 represent appropriately chosen threshold values. In the example given by these Fortran commands, the mixer 87 acts as a change-over switch and the combining circuit 123 acts as an OR-circuit.

```
Y' = MEDIAN (P, D, Q)
IF ( ABS(Y'−D) .GT .T1 ) . OR.
& ( ABS(Y'−P) .LT T2 ) .OR. ( ABS(Y'−Q) .LT. T2 ) THEN
Y = .5 * (P+Q)
ELSE
Y = D
ENDIF
```

The function which has the comparison result as an argument is in this example the OR-function whose result constitutes the logic variable in the IF-command. The line starting with "&" in the IF-command corresponds to the operation of the further comparison circuit 103; if this line is omitted and on the first line of the IF-command the Fortran-symbol ".OR." is replaced by "THEN", then the function which has the comparison result as an argument, is constituted by the unity function.

The efficiency of the interpolation filter of the picture signal processing circuit according to the invention can alternatively be improved by having the direction-determining circuit 55 choose for the vertical direction (that is to say that for the output pair of picture elements (P, Q) of the selection circuit 49 the pair of picture elements (B, B') is chosen), when the pair of picture elements having the best mutual resemblance evidences a slightly better mutual resemblance than the pair of picture elements having the worst mutual resemblance. This prevents a change-over of the selection circuit 49 caused only by noise in the input picture signal.

According to the second implementation of the invention, the mixer 87 should preferably supply as its output signal Y from its output 97 the output signal Y' of the median filter 67 if the vertical direction is opted for. For that purpose the Figure shows, by means of a broken line, a connection between the output 53 of the contour direction determining circuit 55 and a further control input 93' of the mixer 87. This preference is based on the consideration that the measure according to the invention is particularly advantageous for moving sloping contours, but that for vertical contours, the median filter 67 results in less smear than the averaging circuit 83. If the direction is diagonal, the mixer 87 should preferably supply as its output signal from its output 97, the output signal of the averaging circuit 83. In this second implementation, the comparison circuit 75 may be omitted.

The direction selection circuit shown in FIG. 21 of the said European patent application No. EP-A 0,192,292, which compares differences between signals of each time two picture elements relative to each other and to thresholds, is sensitive to noise in practice. An improved operation can be obtained by low-pass filtering the signals of the picture elements A, B, C, A', B' and C' before the direction of the contour is determined. The direction determining circuit 55 can be provided for that purpose with a low-pass filter 551, an input combination of which is constituted by the input combination 57 of the direction determining circuit 55. An output 553 of the low-pass filter 551 is connected to an input 555 of a proper direction determining circuit 557, an input 559 of which is connected to the output 53 of the direction determining circuit 55.

Related direction determining methods include a simple interlaced-to-sequential scanning conversion, for example with the aid of a vertical median filter or another simple vertical interpolation, possibly with motion compensation, followed by a direction-detection. In a first possible direction-detection method, use is thereafter made of a gradient detection by means of the well-known Prewitt or Sobel operators. The arctangent of the quotient of the gradient in the vertical direction and the gradient in the horizontal direction determined with the aid of these operators gives the searched direction of the contour. If so desired, this direction-detection can also be made to depend on the amplitude of the gradient by choosing at an amplitude less than a predetermined threshold, for the vertical direction instead of the direction indicated by the arctangent. In a further possible direction-detection method which is sometimes called "template matching", the sequentially scanned picture signal is convolved with a plurality of masks, whereafter the maximum of the results of the individual products thus obtained is determined. The direction associated with the mask that provided the maximum, is thereafter chosen as the interpolation direction. For the masks to be used the set of masks in accordance with Kirsch or the set of masks in accordance with Prewitt can, for example, be used. For a better understanding of the gradient operators and sets of masks mentioned above reference is made to proceedings of the IEEE, vol. 67, no. 5, May 1979, pp. 753–763.

The interpolation filter described in the foregoing, provided or not provided with the selection circuit 59 with the direction determining circuit 55 and/or the further comparison circuit 103, can be used in a picture signal processing circuit constituting an interlaced-to-sequential scanning conversion circuit when the output 97 of the mixer 87 is connected to a first input 149 of a line compression-and-multiplex circuit 151, a second input 153 of which is connected to the output 37 of the picture element memory 35. The line compression-and-multiplex circuit 151 compresses the line periods of the picture signals applied to the inputs 149 and 153 thereof with a factor of 2 and then supplies, line-alternatingly, a picture signal supplied by the interpolation filter and thereafter compressed, or a compressed input picture signal. A sequentially scanned picture signal is then available at an output 155 of the line compression-and-multiplex circuit 151, which result is denoted by 625/1:1/50, wherein 625 again indicates the number of lines per picture, 1:1 stands for noninterlaced and 50 again indicates the number of fields. Such a line compression-and-multiplex circuit 151 is known per se and may, for example, be in the form of the cascade arrangement of the elements 223 and 244 in FIG. 3 of the European patent application No. EP-A 0,192,292.

The interpolation filter may alternatively be used in a picture signal processing circuit forming a line number doubling circuit which preserves interlace. To that end, the output 97 of the mixer 87 is connected to the first input 157 of a first position-mixer circuit designed as a mixer circuit 159, to a second input 161 of which the signal from the picture element Q is applied, and to a first input 163 of a second position-interpolation circuit designed as a mixer circuit 165, to a second input 167 of which the signal from the picture element P is applied. Since the signals of the picture elements Q and P are applied to the second inputs 161 and 167, respectively, of the respective mixer circuits 159 and 165, also the mixing operations performed by these mixer circuits 159 and 165 are contour dependent. Control inputs 169 and 171 of the mixer circuits 159 and 165, respectively, receive a weighting factor k the value of which, for an appropriate relative positioning of the lines of the output signal, is equal to ¼ during the first field of each picture and equal to ¾ during the second field of each picture. Outputs 173 and 175 of the mixer circuits 159 and 165, respectively, are connected to inputs 177 and 179, respectively, of a line compression-and-multiplex circuit 181, from an output 183 of which the interlaced output signal can be taken with double the number of lines. This output signal is indicated by 1250/2:1/50.

Figure 3:
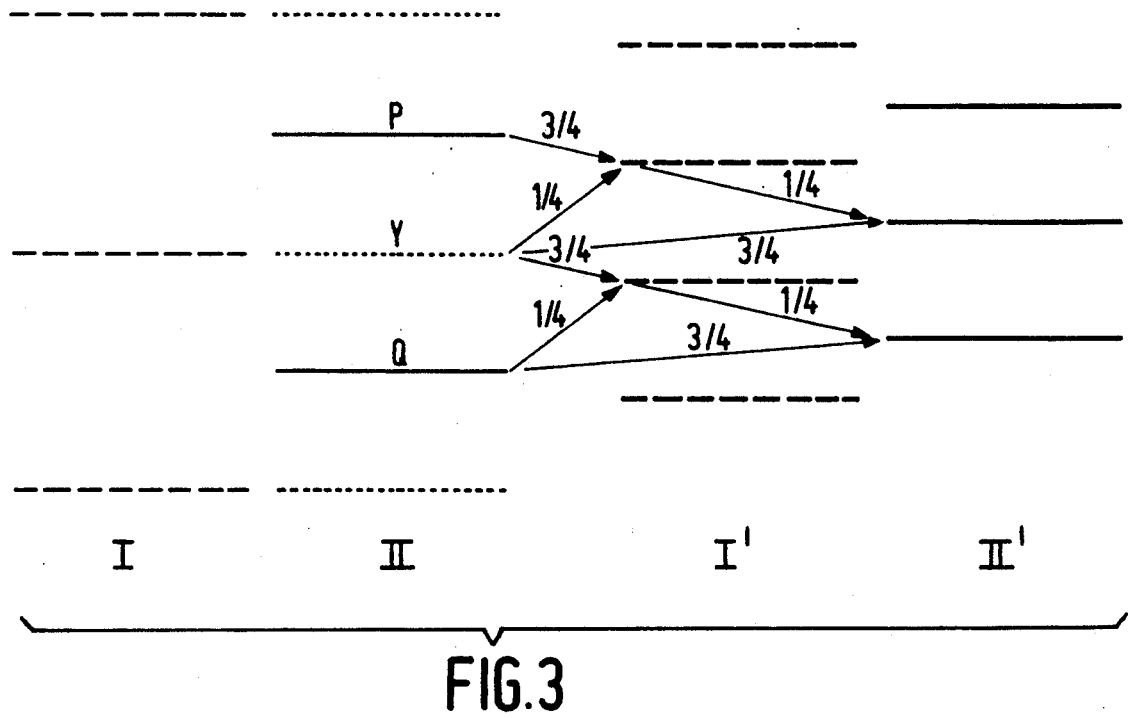
FIG. 3 is a detailed representation of line number doubling operations with and without preserving the interlace with the aid of the picture signal processing circuit of the invention.

In FIG. 3 the operation of the interlaced-to-sequential scanning conversion circuit and of the line number doubling circuit which preserves interlace is illustrated in greater detail. In a left-hand column I, broken lines indicate lines of the first input field, and in a left-hand center column II, solid lines indicate lines of the second input field, the lines of the first and second input fields together forming the 625/2:1/50 input picture signal. In the left-hand center column II, the lines of the output signal Y at the output 97 of the mixer 87 are represented by dotted lines. If the lines of the second field and the lines of the output signal Y are combined by the line compression-and-multiplex circuit 151 as is shown in the left-hand center column, a picture signal is obtained with a sequential or progressive scanning, denoted 1:1, so that the 625/1:1/50 picture signal is formed. In a right-hand center column I', bold broken lines indicate lines of a first output field of the line number doubling circuit which preserves interlace. In a right-hand column II', bold broken lines indicate lines of a second output field of the line number doubling circuit which preserves interlace. The lines of the first and second output fields in the columns I' and II' form together the interlaced 1250/2:1/50 picture signal with double the number of lines. As is indicated by means of arrows, the interlace denoted by 2:1, is obtained in that the weighting factor k of FIG. 1 applied to the control inputs 169 and 171 of the respective mixer circuit 159 and 165 changes its value from field to field (k=¼ or k=¾).

After having read this description, a person skilled in the art will be able to design numerous variations. All these variations are considered to be part of the field of the invention. It is e.g. possible to use a motion detector to select the pixel D in the absence of motion, and the interpolation result Y in the presence of motion.

We claim:

1. A picture signal processing circuit including an interpolation filter comprising a median filter having a first, a second and a third input for receiving respective signals from three positionally consecutive lines from two consecutive fields of a line- and field-sequentially assembled picture signal, said median filter having an output for supplying an output signal which is the median of the supplied signals, characterized in that the interpolation filter further comprises an averaging circuit having a first and a second input coupled to the first and the third input, respectively, of the median filter; a mixer having a first input coupled to the output of the median filter, a second input coupled to an output of the averaging circuit and an output coupled to an output of the interpolation filter; and a comparison circuit having a first input coupled the output of the median filter and a second input coupled to the second input of the median filter, the mixer having a control input coupled to an output of the comparison circuit.

2. A picture signal processing circuit as claimed in claim 1, characterized in that the comparison circuit has a third input which is coupled to an output of a further comparison circuit, a first, a second and a third input of the further comparison circuit being coupled to the first input, the third input and the output, respectively, of the median filter.

3. A picture signal processing circuit as claimed in claim 2, characterized in that the further comparison circuit comprises a first converter circuit having a first and a second input connected to the first input and to the third input, respectively, of the further comparison circuit; a second converter circuit having a first and a second input coupled to the second input and to the third input, respectively, of the further comparison circuit, and a combination circuit having a first and a second input coupled to respective outputs of the first and the second converter circuits, respectively, and an output coupled to the output of the further comparison circuit.

4. A picture signal processing circuit as claimed in claim 3, characterized in that said first and said second converter circuits each comprises a read-only memory and a subtracter circuit, an output of the read-only memory being coupled to the output of the converter circuit and an input of the read-only memory being coupled to an output of the subtracter circuit, inputs of the subtracter circuit being coupled to the respective inputs of the converter circuit.

5. A picture signal processing circuit as claimed in any one of the claims 1 to 4, inclusive, characterized in that the comparison circuit comprises a read-only memory.

6. A picture signal processing circuit as claimed in any one of the claims 1-4, characterized in that said picture signal processing circuit further comprises a first and a second position-interpolation circuit having first inputs respectively coupled to the output of said mixer, and second inputs respectively coupled to the third and the first inputs of said median filter; and a line compression-and-multiplex circuit having inputs coupled, respectively, to outputs of said first and second position-interpolation circuits.

7. A picture signal processing circuit as claimed in any one of the claims 1-4, characterized in that said picture signal processing circuit further comprises a contour direction determining circuit having input means for receiving said picture signal, and an output coupled to a further control input of said mixer.

8. A picture signal processing circuit as claimed in claim 7, characterized in that said input means includes a low-pass filter.

9. A picture signal processing circuit as claimed in claim 7, characterized in that the output of said mixer is coupled to the first input of said mixer, to which the output of said median filter is applied, when the contour direction as determined by said contour direction determining circuit is vertical.

10. A method of processing a line- and field-sequentially assembled picture signal, said method including determining a median of signals of picture elements from three positionally consecutive lines from two consecutive fields of the picture signal and supplying an output signal, characterized in that said method further comprises:
   determining a linear combination of signals of picture elements from two lines other than a central line of said three positionally consecutive lines;
   determining a comparison result of a difference between said median and signals of picture elements from said central line of said three positionally consecutive lines;
   determining a function having said comparison result as an argument; and
   supplying an output signal of said median, said linear combination, or a mixed result of said median and said linear combination in dependence on said function.

11. A method of processing a line- and field-sequentially assembled picture signal, said method including determining a median of signals of picture elements from three positionally consecutive lines from two consecutive fields of the picture signal and supplying an output signal, characterized in that said method further comprises:
   determining a linear combination of signals of picture elements from two lines other than a central line of said three positionally consecutive lines;
   determining a direction of a contour in the picture signal; and
   supplying an output signal of said median, said linear combination, or a mixed result of said median and said linear combination in dependence on said contour direction, wherein said median is supplied when said contour direction is vertical.

12. A method as claimed in claim 11, characterized in that said method further comprises low-pass filtering signals of picture elements used in determining said contour direction.

13. A picture signal processing circuit for processing a line- and field-sequentially assembled picture signal, said picture signal processing circuit comprising means for determining a median of signals of picture elements from three positionally consecutive lines from two consecutive fields of the picture signal and supplying an output signal, characterized in that said picture signal processing circuit further comprises:

means for determining a linear combination of signals of picture elements from two lines other than a central line of said three positionally consecutive lines;

means for determining a comparison result of a difference between said median and signals of picture elements from said central line of said three positionally consecutive lines;

means for determining a function having said comparison result as an argument; and means for supplying an output signal of said median, said linear combination, or a mixed result of said median and said linear combination in dependence on said function.

14. A picture signal processing circuit for processing a line- and field-sequentially assembled picture signal, said picture signal processing circuit comprising means for determining a median of signals of picture elements from three positionally consecutive lines from two consecutive fields of the picture signal and supplying an output signal, characterized in that said picture signal processing circuit further comprises:

means for determining a linear combination of signals of picture elements from two lines other than a central line of said three positionally consecutive lines;

means for determining a direction of a contour in the picture signal; and means for supplying an output signal of said median, said linear combination, or a mixed result of said median and said linear combination in dependence on said contour direction, wherein said median is supplied when said contour direction is vertical.

15. A picture signal processing circuit as claimed in claim 14, characterized in that said picture signal processing circuit further comprises means for low-pass filtering signals of picture elements used in determining said contour direction.

16. A method of processing a line- and field-sequentially assembled picture signal, said method including determining a median of signals of picture elements from three positionally consecutive lines from two consecutive fields of the picture signal and supplying an output signal, characterized in that said method further comprises:

determining a linear combination of signals of picture elements from two lines other than a central line of said three positionally consecutive lines;

determining a function having said picture signal as an argument; and supplying an output signal of said median, said linear combination, or a mixed result of said median and said linear combination in dependence on said function.

17. A picture signal processing circuit for processing a line- and field-sequentially assembled picture signal, said picture signal processing circuit comprising means for determining a median of signals of picture elements from three positionally consecutive lines from two consecutive fields of the picture signal and supplying an output signal, characterized in that said picture signal processing circuit further comprises:

means for determining a linear combination of signals of picture elements from two lines other than a central line of said three positionally consecutive lines;

means for determining a function having said picture signal as an argument; and means for supplying an output signal of said median, said linear combination, or a mixed result of said median and said linear combination in dependence on said function.

* * * * *